Patented Feb. 9, 1943

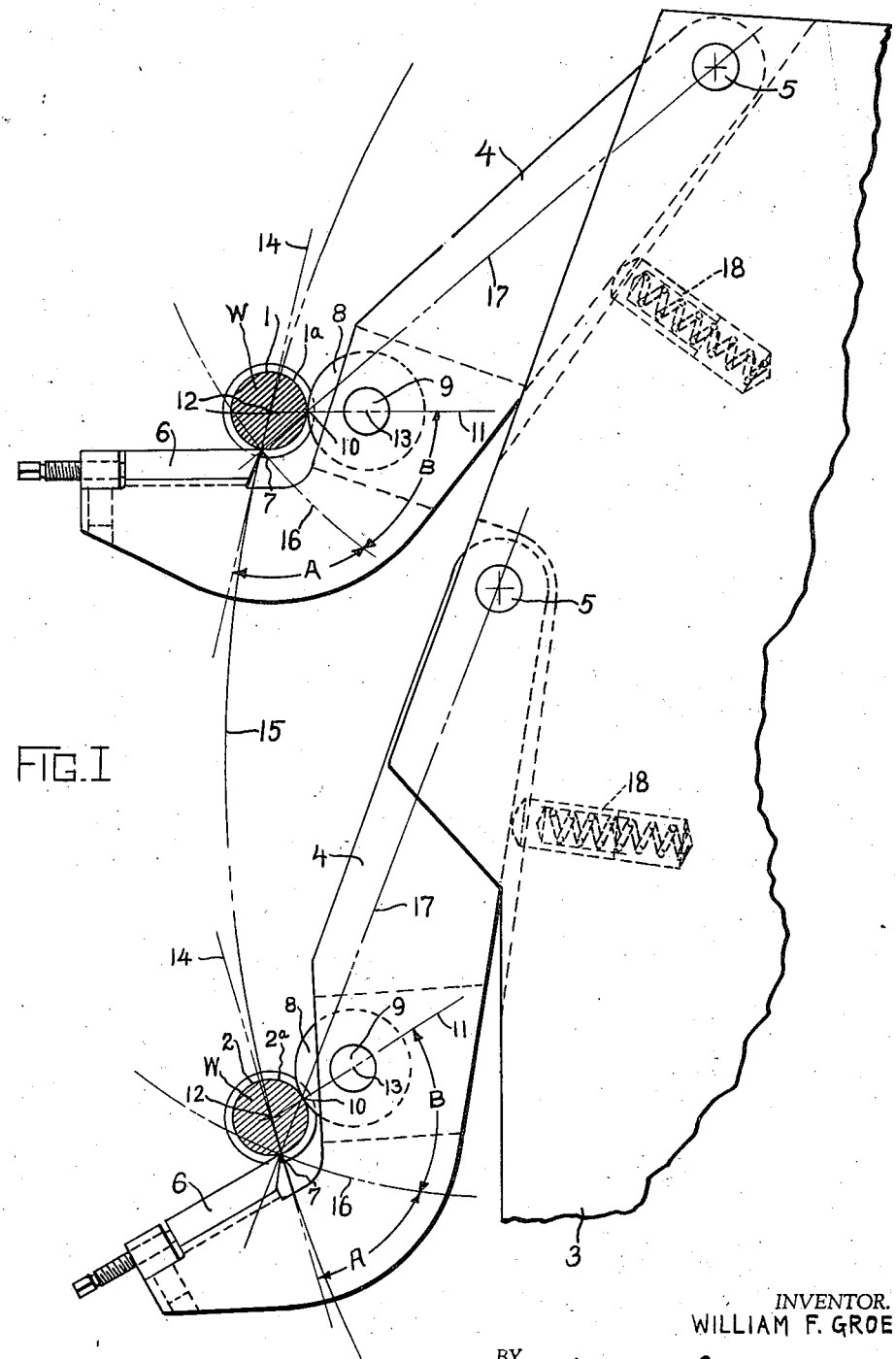

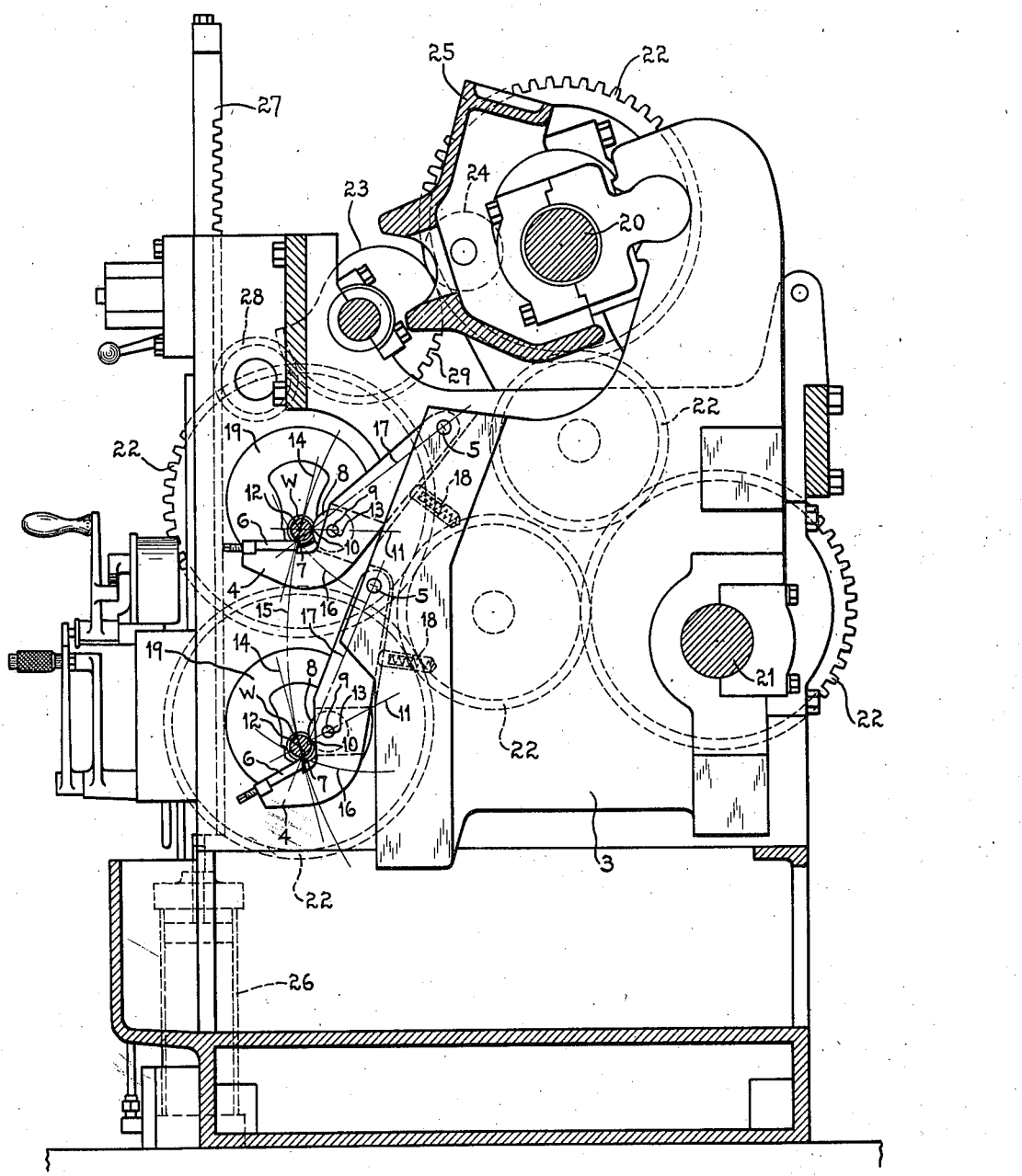
FIG. II
INVENTOR.
WILLIAM F. GROENE
BY Willard L. Groene
ATTORNEY.

2,310,691

UNITED STATES PATENT OFFICE 2,310,691

TOOLHOLDER FOR LATHES

William F. Groene, Cincinnati, Ohio, assignor to The R. K. LeBlond Machine Tool Company, Cincinnati, Ohio, a corporation of Delaware Application December 31, 1940, Serial No. 372,624

6 Claims. (Cl. 82—9)

This invention pertains to a tool holder for lathe and is particularly adapted for use in conjunction with orbital lathes of the multiple spindle type, such, for example, as shown in Patent #2,138,964 of William F. Groene, dated December 6, 1938, in which a plurality of crankshafts are to have their crank pins simultaneously turned in a multiple spindle orbital lathe.

The object of this invention is to provide a series of movably mounted or floating tool holders on the orbitally moving tool carrier of such a lathe. These tool holders are to carry cutting tools fixed thereon, and also these tool holders are to have work engaging portions which contact the work surface being machined so as to limit the relative floating movement of the tool holder with respect to the work carrier and work piece.

Another object of this invention is to provide in a lathe having a tool feeding carrier, a tool holder pivotally mounted on such a tool carrier and having a cutting tool fixed therein and a work engaging portion thereon adapted to engage the work being machined at a point 90 degrees circumferentially removed from the point of contact of the cutting edge of said tool on said work piece, and in which arrangement the axis of pivoting of the tool holder is located in a line passing through the point of contact of the work contacting member with the work surface being machined and the cutting edge of the cutting tool operating upon the work piece.

A still further object of this invention is to provide a floating tool holder mounted on a tool feeding carrier in which the direction of floating movement of the cutting edge of the cutting tool takes place in a direction substantially at a 45 degree angular relationship to the direction of feeding and the line passing through the axis of the pivot, the point of contact of the tool holder with the work, and the cutting edge of the tool with the work surface.

Further features and advantages of this invention will appear from the detailed description of the drawings in which:

Figure I is a fragmentary sectional view through a portion of the orbital tool carrier of a multiple spindle orbital lathe, showing the relative position of the tool holders and tools when in fully fed in position in machining the crank pins of crankshafts in such a lathe.

Figure II is a vertical cross section through a conventional orbital lathe showing the application of the unique tool holders to an orbitally moving tool carrier unit of such a lathe.

For illustrative purposes, this invention is shown applied to a multiple spindle orbital lathe of a character shown in Patent 2,138,964, issued December 4, 1938, having work spindles 19 in which are mounted the work pieces or crankshafts W, having the respective bearing portions 1 and 2. It is to be understood however, that this tool holder could as well be applied to any form of lathe in which rotatable work is to be turned and in which there is a tool feeding device or slide upon which the unique floating tool holders might be mounted.

The lathe has the usual tool feeding carrier 3 which may be actuated in orbital motion by the master crankshafts 20 and 21, Figure II, in this instance, to follow the respective crank pins 1 and 2 of the crankshaft W, upon which is pivotally mounted the tool holders 4 on suitable pivot pins 5 fixed in the carrier 3. The master crankshafts 20 and 21 are interconnected in synchronized rotation with the work spindles 19 through the medium of the gearing 22. The various tool carriers 3 carry the novel cutting tool holders 4 and are swung about the crank pins of the lower rear master crankshaft 21 by a suitable feed cam 23 which operates on a roller 24 of the cradle 25 carrying the upper master crankshaft 20 so as to effect the feeding motion of the tool holders 4 and their tools along the general arcuate line of feeding motion 15. Suitable fluid pressure means such as the cylinder 26 may be employed to actuate the rack 27 and, through the idler gear 28 and the gear teeth 29 cut on the cam 23, to rotate the cam to effect the necessary feeding and presentation of the cutting tools to and from the work pieces W in a conventional manner, as fully disclosed in said above mentioned Patent 2,138,964. In these tool holders 4 are fixed the cutting tools 6 which present a cutting edge 7 to the work surface 1a or 2a to be turned on the work W. Also mounted on the tool holder 4 is the work contacting roller 8 suitably journaled on a stud 9 fixed in the tool holder 4. It is to be noted that the roller 8 contacts the work at a point 10, which is substantially 90 degrees circumferentially removed from the point of contact of the cutting edge 7 of the tool with the work surface.

Expressed in another way, the point of contact 10 of the roller 8 with the work lies in a plane defined by the line 11 which passes through the center or axis 12 of the work W and the axis of rotation 13 of the roller 8 so that this line 11 lies substantially perpendicular to the plane defined by the line 14 which passes through the axis of rotation of the work 12 and the cutting edge 7 of the tool 6. It is also to be further noted that the line 14 lies substantially parallel to the direction of feeding indicated by the arcuate line 15 as followed by the cutting edges of the tools 6 as effected by the tool carrier 3 as fully explained in the above mentioned patent.

The tool holders have pivotal floating motion or floating motion for the cutting edge of the tool 6 so that their cutting edges 7 move in the arcuate line 16 or in an equivalent straight line which lies in substantially a 45 degree angular relationship to that of the direction of feed 15 and the line 11 passing through the axis of the roller 8 and the axis of the work, so that the angles A and B are substantially 45 degree angles. Expressed another way, the floating motion takes place substantially in a plane passing perpendicular to the line 17 defined by the point of contact 10 of the roller with the work W, the cutting edge 7 of the tool, and the axis of the pivot pin 5.

Thus in this arrangement we have provided a structure in which the point of pivoting of the tool holder on the tool carrier, point of contact of the tool holder with the work surface to be machined, and the cutting edge of the tool, all lie in the same plane and in which arrangement the floating movement of the cutting edge of the tool takes place in a direction substantially at a 45 degree angular relationship to the direction of feeding of the cutting edge of the tool to the work surface. And it is to be further noted that the direction of floating movement is also substantially perpendicular to that of the plane defined by the axis of the pivot, the point of contact to the tool holder with the work, and the cutting edge of the tool on the work.

Suitable resilient means comprising the spring urged plunger 18 carried in the tool carrier 3, may be utilized to maintain initial contact of the roller 8 of the tool holder 4 with the work to effect the necessary cutting action of the cutting tool 6.

Having thus fully set forth and described my invention what I claim as new and desire to secure by United States Letters Patent is:

1. In a lathe; a tool carrier; a tool holder floatingly mounted on said carrier; a cutting tool fixed in said holder; having its cutting edge arranged to be fed radially of the axis of rotation of a work piece in said lathe; a work contacting portion on said tool holder engaging said work piece at a point substantially 90 degrees circumferentially removed from the point of contact of the cutting edge of said cutting tool with said work piece; and floating mounting means for said tool holder, located so that the point of contact of said tool holder with the work surface and the cutting edge of said cutting tool lie in a plane parallel to the axis of rotation of the work piece and substantially perpendicular to the direction of floating movement of the cutting edge of said tool relative to said work piece.

2. In a lathe; a tool feeding carrier; a tool holder pivotally mounted on said carrier; a cutting tool fixed in said tool holder; a work engaging portion on said tool holder adapted to engage the surface of the work piece being machined by said cutting edge at a point 90 degrees circumferentially removed from the point of engagement of the cutting edge of said tool with said work piece; pivotal floating mounting means for said tool holder so positioned that the axis of said pivot, the point of contact of said tool holder with the work, and the cutting edge of said tool lie in a common plane parallel to the axis of rotation of said work piece in said lathe; and means for feeding the cutting edge of said tool radially of the axis of rotation of said work piece by movement of said tool carrier.

3. In a lathe; a tool feeding carrier; a tool holder floatingly mounted on said carrier; a cutting tool fixed in said tool holder; a work engaging portion on said tool holder adapted to engage the surface of the work piece being machined by said cutting edge at a point 90 degrees circumferentially removed from the point of engagement of the cutting edge of said tool with said work piece; and floating mounting means for said tool holder, so positioned that floating movement of said tool holder relative to the work piece takes place in a direction perpendicular to a plane parallel to the axis of rotation of the work and passing through the point of contact of the tool holder with the work and the cutting edge of the cutting tool on said tool holder.

4. In a lathe; a tool feeding carrier; a tool holder floatingly mounted on said carrier; a cutting tool fixed in said tool holder; a work engaging portion on said tool holder adapted to engage the surface of the work piece being machined by said cutting edge at a point 90 degrees circumferentially removed from the point of engagement of the cutting edge of said tool with said work piece; floating mounting means for said tool holder, so positioned that floating movement of said tool holder relative to the work piece takes place in a direction perpendicular to a plane parallel to the axis of rotation of the work and passing through the point of contact of the tool holder with the work and the cutting edge of the cutting tool on said tool holder; and means for feeding the cutting edge of said tool radially of the axis of rotation of said work piece by movement of said tool carrier.

5. In a lathe; a tool feeding carrier; a tool holder floatingly mounted on said carrier for floating movement relative to a work piece in said lathe; a work contacting portion on said tool holder; resilient means for holding said work contacting portion in engagement with the work surface being machined; a cutting tool fixed on said tool holder having a cutting edge engaging said work piece at a point 90 degrees circumferentially removed from the point of contact of said tool holder with said work surface to be turned; and pivotal floating mounting means for said tool holder so positioned that the axis of said pivot, the point of contact of said tool holder with said work surface, and the cutting edge of said tool lie in a single plane parallel to the axis or rotation of said work piece in said lathe, with the pivotal floating motion of the cutting edge of said tool taking place in a plane substantially perpendicular to the first mentioned plane.

6. In a lathe; a tool feeding carrier; a tool holder pivotally mounted on said carrier for floating movement relative to a work piece in said lathe; a work contacting portion on said tool holder; resilient means for holding said work contacting portion in engagement with the work surface being machined; a cutting tool fixed on said tool holder having a cutting edge engaging said work piece at a point 90 degrees circumferentially removed from point of contact of said tool holder with said work surface to be turned; pivotal floating mounting means for said tool holder so positioned that the axis of said pivot, the point of contact of said tool holder with said work surface, and the cutting edge of said cutting tool lie in a single plane parallel to the axis of rotation of said work piece in said lathe, so that the pivotal motion of the cutting edge of said tool takes place in a plane substantially perpendicular to said first mentioned plane; and means for feeding said cutting edge of said tool in direction substantially in a 45 degree angular relationship to the plane defined by the axis of said pivot and the point of contact of said cutting edge of said tool with the work.

WILLIAM F. GROENE.